(12) United States Patent
Nicholson et al.

(10) Patent No.: US 10,629,220 B1
(45) Date of Patent: Apr. 21, 2020

(54) SELECTIVE AEC FILTER BYPASS (71) Applicant: LENOVO (Singapore) PTE. LTD., New Tech Park (SG)

(72) Inventors: John Weldon Nicholson, Cary, NC (US); Daryl Cromer, Raleigh, NC (US); Howard Locker, Cary, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 16/367,188

(22) Filed: Mar. 27, 2019

(51) Int. Cl.
*A61F 11/06* (2006.01)
*G10L 21/0208* (2013.01)
*H04R 3/04* (2006.01)
*H04L 29/06* (2006.01)

(52) U.S. Cl.
CPC ........ G10L 21/0208 (2013.01); H04L 65/601 (2013.01); H04L 65/80 (2013.01); H04R 3/04 (2013.01); *G10L 2021/02082* (2013.01)

(58) Field of Classification Search
CPC .... G10L 21/0208; H04L 65/601; H04L 65/80
See application file for complete search history.

(56) References Cited

U.S. PATENT DOCUMENTS

| | | | | |
|---|---|---|---|---|
| 5,029,204 A | * | 7/1991 | Shenoi | H04B 3/23 370/287 |
| 2011/0099485 A1 | * | 4/2011 | Alcorn | H04M 9/082 715/753 |
| 2019/0287546 A1 | * | 9/2019 | Ganeshkumar | H04R 1/1008 |

* cited by examiner

*Primary Examiner* — Simon King
(74) *Attorney, Agent, or Firm* — Kunzler Bean & Adamson (57) ABSTRACT

An apparatus for selective AEC filter bypass is disclosed. A method and computer program product also perform the functions of the apparatus. An apparatus for selective AEC filter bypass is disclosed that includes a filter for an audio handling device that performs acoustic echo cancellation (AEC) on a microphone signal to produce an AEC-filtered microphone signal, a bypass controller that determines whether an AEC bypass parameter corresponding to an audio stream is enabled and a mixer that combines the audio stream with the AEC-filtered microphone signal to produce an AEC-filtered selectively combined signal in response to determining that the AEC bypass parameter corresponding to the audio stream is enabled.

20 Claims, 7 Drawing Sheets

SELECTIVE AEC FILTER BYPASS

FIELD

The subject matter disclosed herein relates to audio handling devices with acoustic echo cancellation filters and more particularly relates to selective AEC filter bypass.

BACKGROUND

Acoustic echo cancellation ("AEC") filters remove speaker output from microphone input. Some teleconferencing systems implement AEC to prevent a remote participant on a call to from hearing an echo of their own speech picked up by the microphone input of the teleconferencing system. In some situations, it may be desired to pass audio other than live speech into a microphone stream. For example, in conventional teleconferencing systems with AEC where a conference call is established over a conferencing speakerphone or similar device, playing a video with sound from a PC, DVD player, or other video device causes the microphone of the teleconferencing system to pick up and relay the audio portion of the video to remote participants. This works because the speaker of the PC, DVD player, or other device which playing back the audio portion of the video is separate from the teleconferencing system so that the AEC filter of the teleconference system does not filter out the audio being played back. In some teleconferencing systems, such as PC-based voice over internet protocol ("VOIP") calls, sharing multimedia is quite difficult. In a PC-based teleconferencing system with an AEC filter a user will play a multimedia file and the other side will not hear anything.

BRIEF SUMMARY

An apparatus for selective AEC filter bypass is disclosed. A method and computer program product also perform the functions of the apparatus. An apparatus for selective AEC filter bypass is disclosed that includes a filter for an audio handling device that performs acoustic echo cancellation (AEC) on a microphone signal to produce an AEC-filtered microphone signal, a bypass controller that determines whether an AEC bypass parameter corresponding to an audio stream is enabled and a mixer that combines the audio stream with the AEC-filtered microphone signal to produce an AEC-filtered selectively combined signal in response to determining that the AEC bypass parameter corresponding to the audio stream is enabled.

A method for selective AEC filter bypass is disclosed that performs acoustic echo cancellation (AEC) on a microphone signal to produce an AEC-filtered microphone signal, determines whether an AEC bypass parameter corresponding to an audio stream is enabled and combines the audio stream with the AEC-filtered microphone signal to produce an AEC-filtered selectively combined signal in response to determining that the AEC bypass parameter corresponding to the audio stream is enabled.

A system for selective AEC filter bypass is disclosed that includes an audio handling device comprising one or more processors, computer readable storage media, and code executable by the one or more processors. The system further includes one or more microphones that provide a microphone signal to the audio handling device and one or more speakers that play audio output from the audio handling device. The system includes an audio handling device that is configured to perform acoustic echo cancellation (AEC) on the microphone signal to produce an AEC-filtered microphone signal, determine whether an AEC bypass parameter corresponding to an audio stream is enabled, and combine the audio stream with the AEC-filtered microphone signal to produce an AEC-filtered selectively combined signal in response to determining that the AEC bypass parameter corresponding to the audio stream is enabled.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," "component," "controller," "block," or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, components, controllers, or blocks in order to more particularly emphasize their implementation independence. For example, a module, controller, block, or system may be implemented as a hardware circuit comprising custom VLSI circuits or gate arrays, off-the-shelf semiconductors such as logic chips, transistors, or other discrete components. A module, component, controller, block, or system may also be implemented in programmable hardware devices such as field programmable gate arrays, programmable array logic, programmable logic devices or the like.

Modules, components, controllers, or blocks may also be implemented in code and/or software for execution by various types of processors. An identified module, controller, or block of code may, for instance, comprise one or more physical or logical blocks of executable code which may, for instance, be organized as an object, procedure, or function. Nevertheless, the executables of an identified module, controller, block, or system need not be physically located together, but may comprise disparate instructions stored in different locations which, when joined logically together, comprise the module and achieve the stated purpose for the module, component, controller, or block.

Indeed, a module, component, controller, or block of code may be a single instruction, or many instructions, and may even be distributed over several different code segments, among different programs, and across several memory devices. Similarly, operational data may be identified and illustrated herein within modules, components, controllers, or blocks, and may be embodied in any suitable form and organized within any suitable type of data structure. The operational data may be collected as a single data set, or may be distributed over different locations including over different computer readable storage devices. Where a module, component, controller, or block, or portions thereof are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, components, controllers, or blocks, user selections, network transactions, database queries, database structures, hardware modules, components, controllers, or blocks, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, component, controller, block, segment, or portion of code, which comprises one or more executable instructions of the code for implementing the specified logical function(s).

It should also be noted that, in some alternative implementations, the functions noted in the block diagram may occur out of the order noted in the Figures. For example, two blocks of a block diagram shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

One embodiment of an apparatus for selective AEC filter bypass includes a filter for an audio handling device that performs acoustic echo cancellation (AEC) on a microphone signal to produce an AEC-filtered microphone signal, a bypass controller that determines whether an AEC bypass parameter corresponding to an audio stream is enabled, and a mixer that combines the audio stream with the AEC-filtered microphone signal to produce an AEC-filtered selectively combined signal in response to determining that the AEC bypass parameter corresponding to the audio stream is enabled.

In some embodiments, the bypass controller automatically enables the AEC bypass parameter in response to detecting a start of the audio stream during an ongoing bidirectional communication session over a network. In various embodiments, the bypass controller enables the AEC bypass parameter based on one or more of a type of the audio stream and an AEC setting for the audio stream. In certain embodiments, the apparatus includes a user interface for selecting the AEC setting for the audio stream. The user interface for selecting the AEC setting for the audio stream, in some embodiments, is displayed in response to detecting a start of the audio stream during an ongoing bidirectional communication session of voice data over a network. In various embodiments, the AEC setting is initialized at a start of the bidirectional communication session to disable the AEC bypass parameter for the audio stream and in other embodiments, the AEC setting is initialized at a start of the bidirectional communication session to enable the AEC bypass parameter for the audio stream.

In one embodiment, the audio stream comprises one or more individual audio streams to be combined with the AEC-filtered microphone signal. In various embodiments, the AEC setting for the audio stream comprises one or more individual settings corresponding respectively to the one or more individual audio streams. In another embodiment, the audio handling device is a near end portable computing device and the AEC-filtered selectively combined signal is communicated at least over a data network connection to a far end device.

A method for selective AEC filter bypass in one embodiment, performs acoustic echo cancellation (AEC) on a microphone signal to produce an AEC-filtered microphone signal, determines whether an AEC bypass parameter corresponding to an audio stream is enabled and combines the audio stream with the AEC-filtered microphone signal to produce an AEC-filtered selectively combined signal in response to determining that the AEC bypass parameter corresponding to the audio stream is enabled.

In various embodiments, the method automatically enables the AEC bypass parameter in response to detecting a start of the audio stream during an ongoing bidirectional communication session of voice data over a network. Enabling the AEC bypass parameter in some embodiments is based on one or more of a type of the audio stream and an AEC setting for the audio stream. In certain embodiments, the method selects the AEC setting for the audio stream. The method, in some embodiments, includes displaying a user interface for selecting the AEC setting for the audio stream in response to detecting a start of the audio stream during an ongoing bidirectional communication session of voice data over a network.

In one embodiment, the AEC setting is initialized at a start of the bidirectional communication session to disable the AEC bypass parameter for the audio stream and in another embodiment the AEC setting is initialized at a start of the bidirectional communication session to enable the AEC bypass parameter for the audio stream. In some embodiments, the audio stream comprises one or more individual audio streams to be combined with the AEC-filtered microphone signal. In various embodiments, the AEC setting for the audio stream comprises one or more individual settings corresponding respectively to the one or more individual audio streams.

A system for selective AEC filter bypass includes in one embodiment, an audio handling device comprising one or more processors, computer readable storage media, and code executable by the one or more processors. The system further includes one or more microphones that provide a microphone signal to the audio handling device and one or more speakers that play audio output from the audio handling device. The system includes an audio handling device that is configured to perform acoustic echo cancellation (AEC) on the microphone signal to produce an AEC-filtered microphone signal, determine whether an AEC bypass parameter corresponding to an audio stream is enabled, and combine the audio stream with the AEC-filtered microphone signal to produce an AEC-filtered selectively combined signal in response to determining that the AEC bypass parameter corresponding to the audio stream is enabled.

Figure 1:
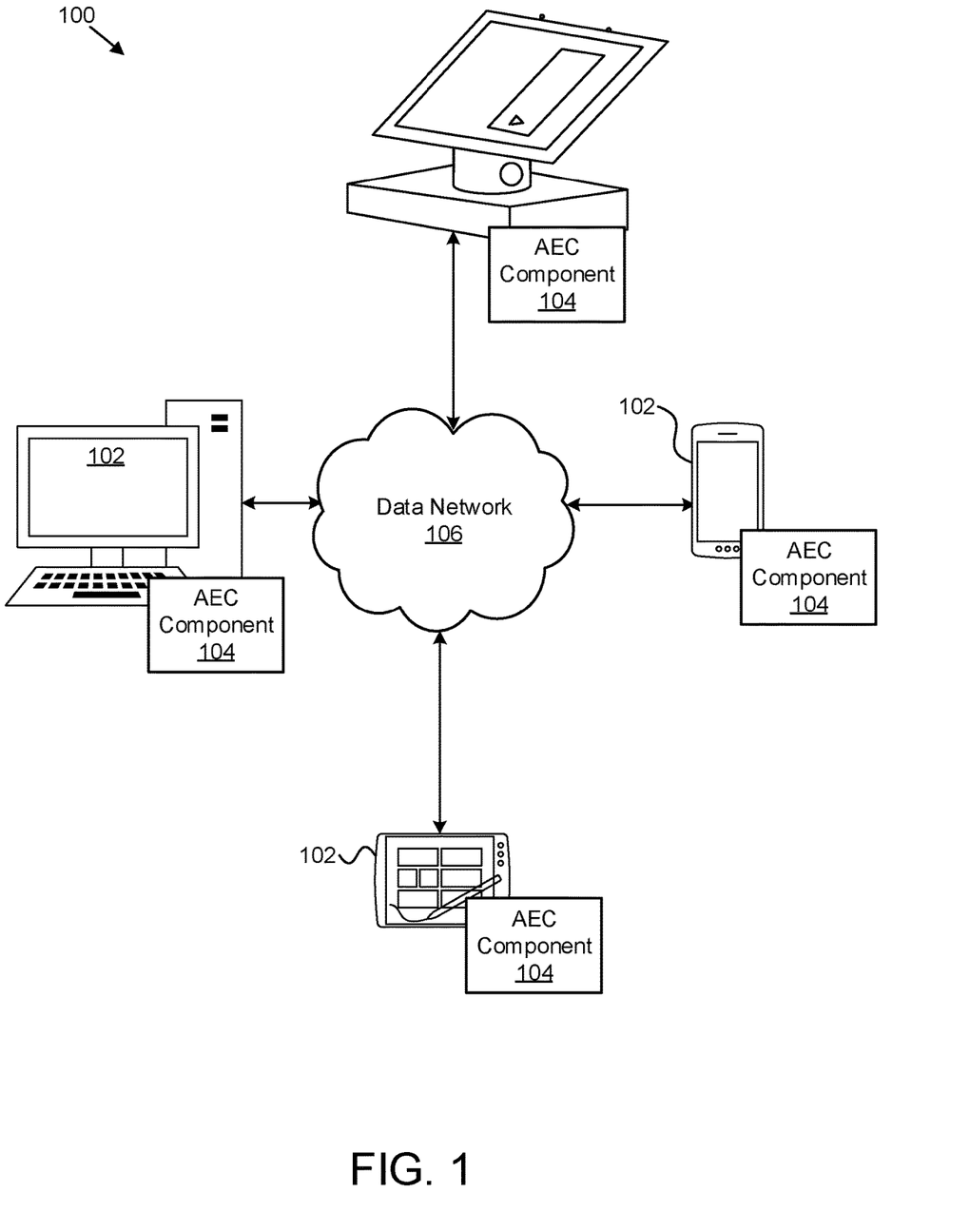
FIG. 1 is a schematic block diagram illustrating one embodiment of a system for selective AEC filter bypass.

FIG. 1 depicts a schematic block diagram illustrating one embodiment of a system 100 for selective AEC filter bypass. In one embodiment, the system 100 includes audio handling devices 102, AEC components 104, and data networks 106. Even though a specific number of audio handling devices 102, AEC components 104, and data networks 106 are depicted in FIG. 1, one of skill in the art will recognize that any number of audio handling devices 102, AEC components 104, and data networks 106 may be included in the system 100.

In one embodiment, the term "audio handling device" refers to one or more devices such as desktop computers, laptop computers, personal digital assistants ("PDA"s), tablet computers, smart phones, cellular phones, smart televisions (e.g., televisions connected to the Internet), set-top boxes, game consoles, security systems (including security cameras), vehicle onboard computers, streaming devices, speaker phones, intercoms, sound systems, audio players, video players, radios, televisions, smart appliances, or the like. In some embodiments, the audio handling device 102 accesses the data network 106 directly using a network connection. In certain embodiments, the audio handling device 102 may be one or more wearable devices such as smart watches, optical head-mounted displays, or the like.

In certain embodiments, one or more of the audio handling devices 102 includes an embodiment of the AEC component 104. In various embodiments, the AEC component 104 performs acoustic echo cancellation (AEC) on a microphone signal to produce an AEC-filtered microphone signal. In some embodiments, the AEC component 104 determines whether an AEC bypass parameter corresponding to an audio stream is enabled. The AEC component 104, in various embodiments, combines the audio stream with the AEC-filtered microphone signal to produce an AEC-filtered selectively combined signal in response to determining that the AEC bypass parameter corresponding to the audio stream is enabled. In this manner, the AEC component 104 is used for selectively bypassing an AEC filter of the audio handling device 102

The data network 106, in one embodiment includes a digital communication network that transmits digital communications. In some embodiments, the data network 106 includes a wireless network such as a wireless cellular network, local wireless network, such as a Wi-Fi network, a Bluetooth® network, and ad hoc network, and/or the like. In certain embodiments, the data network 106 may include a wide area network ("WAN"), a local area network ("LAN"), an optical fiber network, the Internet, or other digital communication network. In one embodiment, the data network 106 includes two or more networks. The data network 106 may in some embodiments, include one or more servers, routers, switches, and or other networking equipment. In certain embodiments, the data network 106 also includes computer readable storage media such as a hard disk drive, an optical drive, nonvolatile memory, RAM, or the like.

Figure 2:
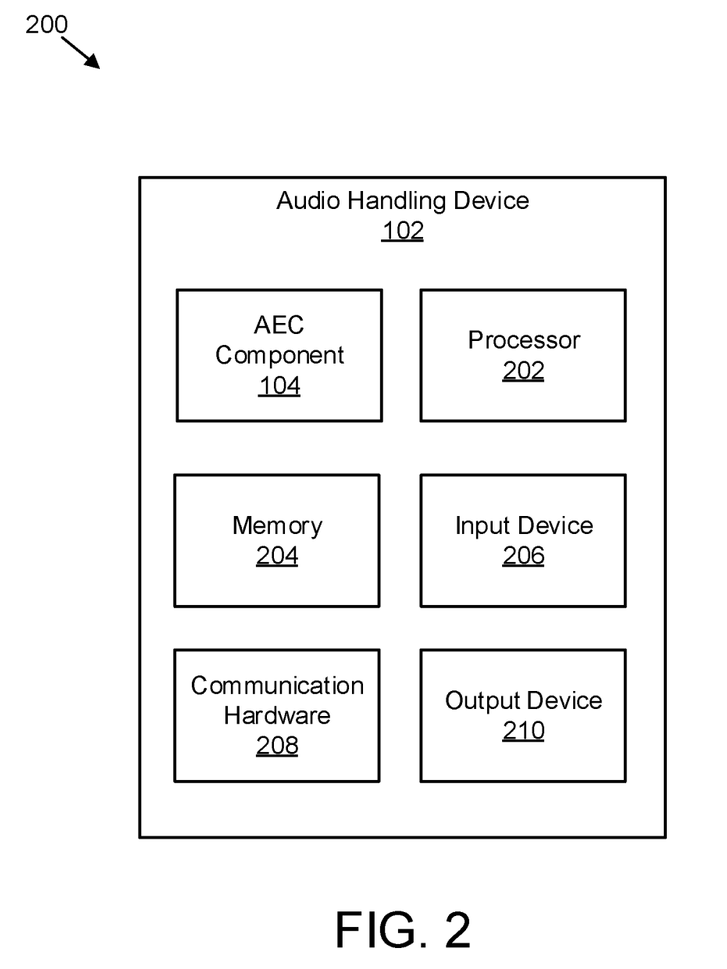
FIG. 2 is a schematic block diagram illustrating one embodiment of an apparatus with an audio handling device including an AEC component.

FIG. 2 is a schematic block diagram illustrating one embodiment of an apparatus 200 that may be used for selective AEC filter bypass. The apparatus 200 includes one embodiment of the audio handling device 102. Furthermore, the audio handling device 102 in one embodiment includes the AEC component 104, a processor 202, a memory 204, and input device 206, communication hardware 208, and an output device 210. In some embodiments, the input device and the output device 210 are combined into a single device such as a touch screen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the AEC component 104, the input device 206, the communication hardware 208, and the output device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to audio streams. In some embodiments, the memory 204 also stores program code and related data, such as an operating system or other controller algorithms operating on the audio handling device 102.

The audio handling device 102 may use the AEC component 104 for selective AEC filter bypass. As may be appreciated, the AEC component 104 may include computer hardware, computer software, or a combination of both computer hardware and computer software. For example, the AEC component 104 may include circuitry, or a processor, used to perform, by use of the processor 202, acoustic echo cancellation (AEC) on a microphone signal to produce an AEC-filtered microphone signal. As another example, the AEC component 104 may include computer program code that determines whether an AEC bypass parameter corresponding to an audio stream is enabled. As a further example, the AEC component 104 may include computer program code that combines the audio stream with the AEC-filtered microphone signal to produce an AEC-filtered selectively combined signal in response to determining that an AEC bypass parameter corresponding to the audio stream is enabled.

The input device 206, in various embodiment, includes one or more microphones that capture sound such as speech, audio played back the output device 210 or by different device configured to output audio such as, for example, a computer, tablet, cell phone, speaker phone, intercom, sound system, audio player, video player, radio, television, smart appliance, and the like, may include any known computer input device including a touch panel, a button, a keyboard, a stylus, or the like. In some embodiments, the input device 206 may be integrated with the output device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

In various embodiments, the communication hardware 208 facilitates communication with other devices. For example, the communication hardware 208 may enable communication via Bluetooth®, Wi-Fi, and so forth. In some embodiments, the communication includes bidirectional communication session of voice data over a network connection such as for example, VOW streams, VOW sessions, broadcasts, etc. In certain embodiments, the terms "VOIP," "VOIP stream," or "VOIP session" are used to refer to communication over various types of network technologies (e.g., managed networks, cellular networks, networks, radio networks, and so forth) for communicating audio data (e.g., sounds, voices, etc.) and is not limited to communications over the public Internet or networks that use packets or internet protocol.

In one embodiment, the output device 210 includes one or more speakers for producing sound. For example, in various embodiments the output device 210 plays back audio streams from various applications such as teleconferencing applications, online education application, social media applications, audio and video media applications, recording applications, smart assistant applications, and so forth.

In various embodiments, the output device 210 further includes an electronically controllable display or display device. The output device 210 in certain embodiments is designed to output visual, audible, and/or haptic signals. In some embodiments, the output device 210 includes an electronic display capable of outputting visual data to a user. For example, in various embodiments, the output device 210 includes one or more display devices such as an LCD display, an LED display, an OLED display, a projector, or similar output device capable of outputting sounds, images, text, or the like to a user. As another, non-limiting, example, the output device 210 in some embodiments includes a wearable display such as a smart watch, smart glasses, a heads-up display, or the like. Further, the output device 210, in some embodiments, is a component of a smart phone, a personal digital assistant, a television, a table computer, a notebook (laptop) computer, a personal computer, a vehicle dashboard, a streaming device, audio player or the like.

In some embodiments, all or portions of the output device 210 may be integrated with the input device 206. For example, the input device 206 and output device 210 may form a touchscreen or similar touch-sensitive display. In other embodiments, the output device 210 may be located near the input device 206. In certain embodiments, the output device 210 may receive instructions and/or data for output from the processor 202 and/or the AEC component 104.

Figure 3:
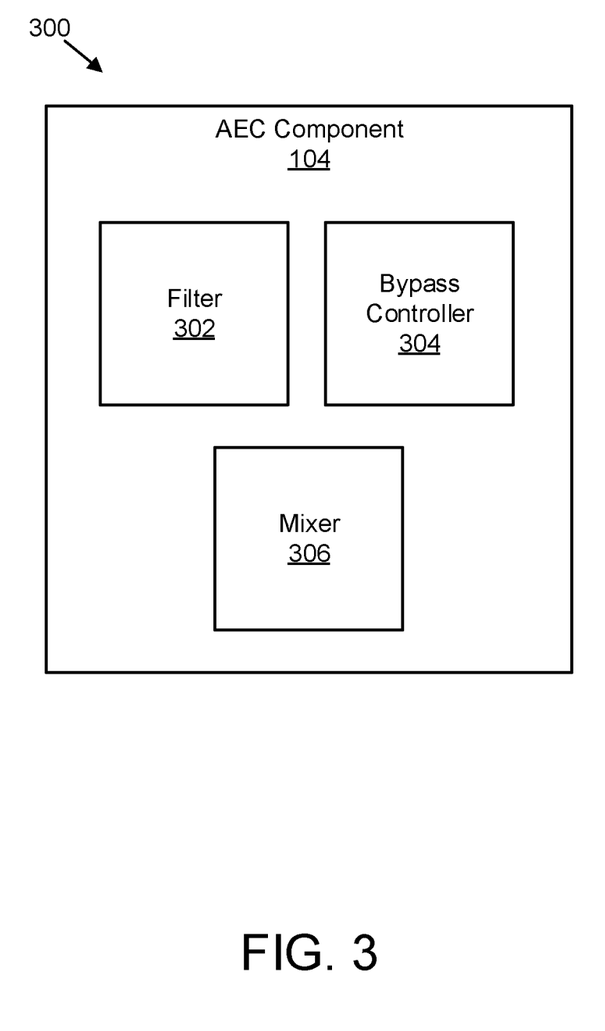
FIG. 3 is a schematic block diagram illustrating one embodiment of an apparatus including an AEC component for selective AEC filter bypass.

FIG. 3 depicts a schematic block diagram illustrating one embodiment of an apparatus 300 that includes one embodiment of the AEC component 104 for selective AEC filter bypass. Furthermore, the AEC component 104 includes a filter 302, a bypass controller 304, and a mixer 306.

The filter 302, in one embodiment, performs acoustic echo cancellation on a microphone signal to produce an AEC-filtered microphone signal. In some embodiments, the filter 302 performs acoustic echo cancellation on a microphone signal by determining characteristics of an echo signal for a particular venue such as a room, generating a copy of the echo signal, and subtracting the echo signal from the microphone signal to produce an AEC-filtered microphone signal. In certain embodiments, the filter 302 is implemented in firmware running on a DSP of an audio codec of the audio handling device 102. In some embodiments, the filter 302 is an adaptive filter that adapts to changing characteristics of the microphone signal for the venue implements. For example, in various embodiments, the filter 302 uses a least means-squared algorithm, an adaptive finite impulse response filter, or any number of AEC filter algorithms recognizable be a person of ordinary skill in the art for acoustic echo cancellation.

The bypass controller 304, in one embodiment, determines whether an AEC bypass parameter corresponding to an audio stream is enabled. In certain embodiments, the AEC bypass parameter is data element that has an enabled state and a non-enabled state. In some embodiments, the AEC bypass parameter includes multiple data elements. In various embodiments, the bypass controller 304 includes code that causes a processor to read the AEC bypass parameter. In other embodiments, the AEC bypass parameter includes one or more electronically detectable signals, individually or in combination having an enabled state and a non-enabled state.

In various embodiments, the AEC bypass parameter corresponds (e.g., links to, is associated with, etc.) to an audio stream such as sound from a video presentation, an audio presentation, a broadcast, a software application, a multimedia presentation, a sound clip, and the like. In certain embodiments, the bypass controller 304 automatically enables the AEC bypass parameter in response to detecting a start of the audio stream during an ongoing bidirectional voice communication session over a network connection. In some embodiments, the bypass controller 304 enables the AEC bypass parameter based on one or more of a type of the audio stream and an AEC setting for the audio stream.

For example, during an ongoing bidirectional voice communication session over a network connection, a new caller is added to the teleconference, this type of audio stream (e.g., voice data) could still be susceptible to acoustic echoes. Accordingly, in such an embodiment, the bypass controller 304 does not enable the AEC bypass parameter so that acoustic echoes related to the new caller will be filtered. In a different example, if during an ongoing bidirectional voice communication session over a network connection such as a streaming online education session, a presenter using an audio handling device having a speaker, a microphone, and an AEC component, plays a video clip as part of the presentation, the bypass controller 304 enables the AEC bypass parameter so that remote participants can hear the audio portion of the video clip.

The mixer 306, in one embodiment, combines the audio stream with the AEC-filtered microphone signal to produce an AEC-filtered selectively combined signal in response to determining that an AEC bypass parameter corresponding to the audio stream is enabled. For example, if in certain embodiments, the bypass controller 304 enables the AEC bypass parameter so that remote participants can hear the audio portion of the video clip without it having acoustic echo cancellation performed on it, the mixer 306 combines the audio portion of the video clip with the AEC-filtered microphone signal from the microphone used by the presenter, to produce an AEC-filtered selectively combined signal in response to determining that an AEC bypass parameter corresponding to the audio portion of the video clip is enabled. In various embodiments, the mixer 306 includes one or more of a digital audio summing circuit, digital audio summing software, and/or an analog summing circuit.

Figure 4:
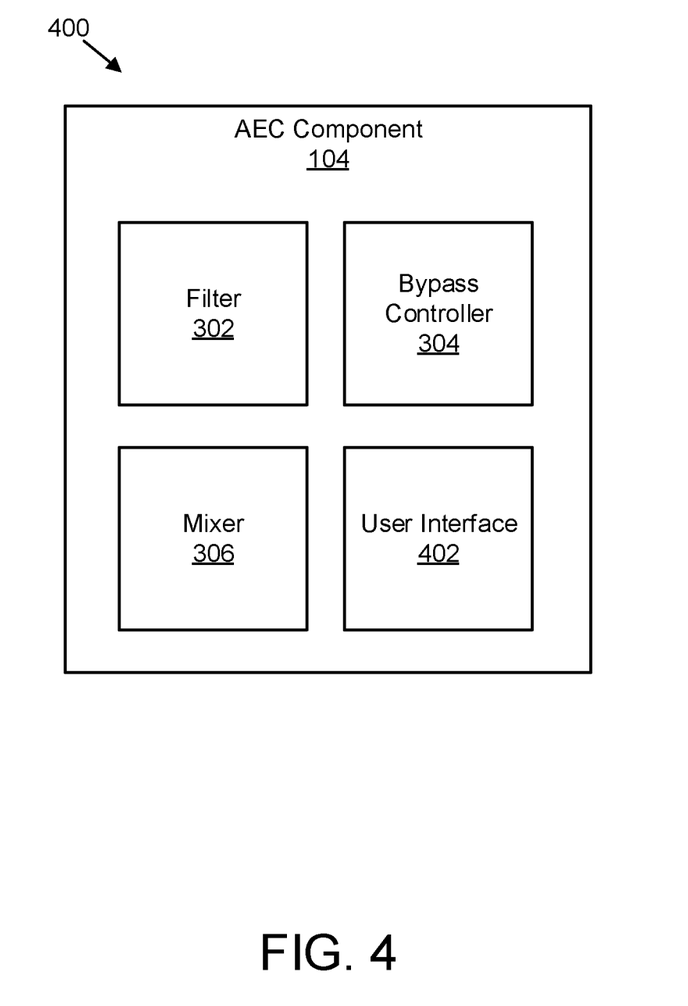
FIG. 4 is a schematic block diagram illustrating another embodiment of an apparatus including an AEC component for selective AEC filter bypass.

FIG. 4 is a schematic block diagram illustrating another embodiment of an apparatus 400 including an AEC component 104 for selective AEC filter bypass. The AEC component 104 includes one embodiment of the filter 302, the bypass controller 304, and the mixer 306, that may be substantially similar to the filter 302, the bypass controller 304, and the mixer 306 described in relation to FIG. 3. The apparatus 400 further includes a user interface 402 for selecting an AEC setting for an audio stream. In some embodiments, the user interface 402 for selecting the AEC setting for the audio stream is displayed in response to detecting a start of the audio stream during an ongoing bidirectional communication session of voice data over a network connection. In other words, the user interface 402 provides for selection of which audio stream(s) should bypass the AEC filter. In some embodiments, the user interface 402 includes a prompt at the start of an audio stream if a VOIP session is ongoing. For example, in some embodiments, if a VOIP session is ongoing and an audio stream is started such as for example by playing audio file such as an MP3 file, an MP4 file with an audio portion, or navigating to a network site that streams audio, a pop-up window of the user interface 402 is displayed in response to detecting the start of the audio stream so that a user interface allows selection of whether to bypass AEC for the audio stream.

In certain embodiments, the AEC setting is initialized at a start of the bidirectional communication session to enable the AEC bypass parameter for all audio stream or streams except the VOIP stream. For example, upon starting a bidirectional communication session, the default state of the AEC setting causes AEC to be bypassed for the audio stream automatically according to the AEC setting initial state unless the AEC setting is changed (e.g., via the user interface).

In other embodiments, the AEC setting is initialized at a start of the bidirectional communication session to disable the AEC bypass parameter for the audio stream. In such embodiments, when a bidirectional communication session of voice data over a network, of such as a VOW session is ongoing and a start of an audio stream is detected, the apparatus 400 will perform AEC filtering (e.g., using the filter 302) on the audio stream. In other words, the default state of the AEC setting in such embodiments is initialized to cause AEC to be performed on the audio stream and AEC filtering will only be bypassed for audio stream selected by the user interface or by audio stream type.

In various embodiments, the audio stream includes one or more individual audio streams to be combined with the AEC-filtered microphone signal. In some embodiments, the AEC setting for the audio stream comprises one or more individual settings corresponding respectively to the one or more individual audio streams. In other words, the AEC setting in some embodiments has multiple fields that correspond to multiple individual audio streams where the multiple fields may be individually set or not set to bypass or not bypass AEC for the individual audio streams.

Although the AEC component for selective AEC filter bypass is suitable for teleconferencing system that use wired connections such as ethernet connections, PBX connections, etc., in some embodiments, the audio handling device 102 is a near end portable computing device and the AEC-filtered selectively combined signal is communicated at least over a wireless connection to a far end device. For example, the audio handling device 102 in one embodiment may be a near end audio handling device such as a smart phone with handsfree mode travelling in vehicle establishes a bidirectional communication session over a wireless network with a far end device such as a conferencing system in an online education classroom. The near end audio handling device may be used to share a clip that includes audio with remote participants (i.e., at one or more far ends) and the user interface 402 may be a voice command interface that permits the near end handling device to selectively bypass the shared audio stream and to not bypass a different audio stream not shared.

Figure 5:
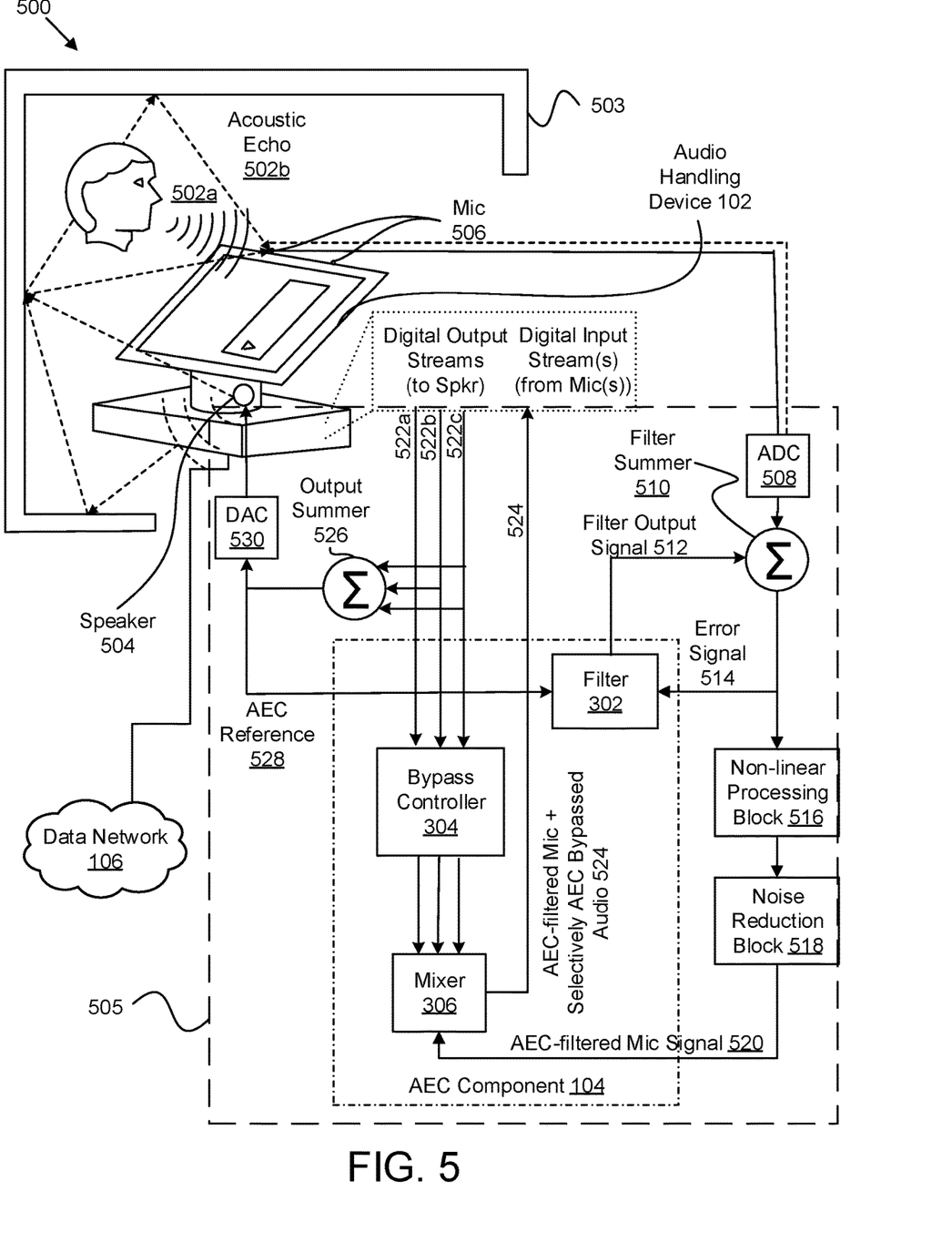
FIG. 5 is a schematic block diagram illustrating another embodiment of a system for selective AEC filter bypass during a bidirectional communication session.

FIG. 5 is a schematic block diagram illustrating another embodiment of a system 500 for selective AEC filter bypass during a bidirectional communication session. In the embodiment, the system 500 includes a voice signal 502a directed toward a microphone 506 of an audio handling device 102 such as a smart hub for a conference room 503. In one embodiment, the audio handling device 102 includes multiple microphones 506 (also referred to as mics) that may be built-in or individually connected. The audio handling device 102 in certain embodiments includes one or more speakers 504 that may be built-in or individually connected. The audio handling device 102 connects to a data network 106 via a wireless or wired connection.

In certain embodiments, the system 500 includes an audio handling device 102 with one or more processors, computer readable storage media, and code executable by the one or more processors. In some embodiments, the system 500 includes one or more microphones 506 that provide a microphone signal to the audio handling device. In various embodiments, the system 500 includes one or more speakers 504 for playing audio output from the audio handling device 102, where the audio handling device 102 is configured to perform acoustic echo cancellation (AEC) on a microphone signal to produce an AEC-filtered microphone signal 520. The audio handling device is further configured, in such embodiments, to determine whether an AEC bypass parameter corresponding to an audio stream is enabled and to combine the audio stream with the AEC-filtered microphone signal 520 to produce an AEC-filtered selectively combined signal in response to determining that the AEC bypass parameter corresponding to the audio stream (e.g., 522a, 522b, and/or 522c) is enabled.

In various embodiments, the system 500 includes audio handling components 505. In some embodiments, the audio handling device 102 includes an AEC component 104 with a filter 302, a bypass controller 304, and a mixer 306. In various embodiments, the audio handling components may include an analog-to-digital converter (ADC) 508 that converts an analog microphone signal or signals to a digital microphone signal or signals. Although only one microphone signal is depicted, a person of ordinary skill in the art will recognize that multiple microphone signals may be included.

In certain embodiments, the system 500 includes one or more digital output streams e.g., 522a, 522b, 522c, to be played by the speaker 504 of the audio handling device 102 after they have been combined, (e.g., summed or mixed using an output summer 526) and converted from digital audio signals to analog using a digital-to-analog converter (DAC) 530. Sounds from the speaker 504 reflects off one or more walls of the conference room 503 and are picked up by the microphones 506. If the sounds correspond to a voice stream from a far end device transmitted to the audio handling device 102 via data network 106, the reflected voice sounds would be picked up by the microphones 506 as an acoustic echo 502b and included in the microphone signal which in turn would be mixed with the voice signal 502a at the near end. Thus, in the absence of acoustic echo cancellation, the acoustic echo 502b may become part of the digital input 524 to be transmitted to the far end device over the data network 106.

As depicted in FIG. 5, the AEC component 104, may include a filter 302 that uses an output of an output summer 526 which combines the audio streams 522a, 522b, 522c (e.g., digital output streams) to be converted by a digital to analog converter (DAC) 530 to an analog signal for driving the one or more speakers 504. The output of the output summer 526 also serves as an AEC reference signal 528 which is input to a filter 302 such as an adaptive filter to produce a filter output signal 512 by a filter summer 510 adaptively subtracting an AEC reference signal 528 depending on the magnitude of an error signal 514 that is fed into the filter 302. The system 500 may further include other audio handling components 505 such as a nonlinear processing block 516 and/or a noise reduction block 518 that further process the output of the filter summer 510 to produce an AEC-filtered microphone signal 520.

In conventional AEC systems, the AEC-filtered microphone signal 520 may be fed as a digital input 524 which is then communicated over a bidirectional audio communication link to a far end system, thus reducing the acoustic echo 502b heard by the far end system. The system 500 improves acoustic echo cancellation by providing selective AEC bypass capabilities.

For example, if during an ongoing bidirectional communication section of voice data over the data network 106, the audio handling device 102 plays an audio stream e.g. 522b intended to be heard at the far end, the bypass controller 304 causes the audio stream to bypass acoustic echo cancellation because it is a predetermined type of audio stream that should bypass AEC or because an AEC bypass setting corresponding to the audio stream enables the AEC bypass parameter.

In other words, the AEC component 104 includes a bypass controller 304 that determines whether an AEC bypass parameter corresponding to an audio stream such as any of the audio streams 522a, 522b, and/or 522c is enabled. The AEC component 104 further includes a mixer 306 that combines the selected audio stream or audio streams with the AEC-filtered microphone signal 520 produce the digital input 524 that is an AEC-filtered selectively combined signal (e.g., an AEC-filtered microphone signal with the bypassed audio stream added or combined back in) in response to the bypass controller 304 determining that the AEC bypass parameter corresponding to the audio stream is enabled.

Individual output audio streams e.g., 522a, 522b, and/or 522c, may be individually bypass enabled or disabled and may be initialized to have a default state that enables or disables AEC bypass. Accordingly, in contrast to conventional systems in which the AEC filter results in the far end device not hearing the audio stream played on the audio handling device 102, with the AEC bypass enabled, the conferencing capabilities are improved by permitting AEC filters to be performed on the microphone signals thus reducing acoustic echoes and at the same time adding the selected digital output audio streams to bypass the AEC filter, without having to establish a separate network connection for the audio stream or streams to bypass the AEC filter and the microphone stream which benefits from not bypassing the AEC filter.

One of ordinary skill in the art will recognize that the embodiment depicted in FIG. 5 is one example embodiment and that other embodiments not necessarily involving bidirectional data communications may also benefit from the various embodiments described herein.

For example, assume that an audio handling device 102 is a smart assistant having AEC filtering that is playing a song started by a smartphone user connected via a Bluetooth or Wi-Fi connection to the smart assistant. Further assume, that the audio handling device 102 e.g., the smart assistant, is connected to a song identification service that identifies a title of the song based on audio analysis. In response to a voice query to the smart assistant such as for example "what song is this?" the AEC bypass capabilities of the apparatuses 300, 400 depicted in FIG. 3 and FIG. 4 would enable the audio the smart assistant to respond to the question notwithstanding that the smart assistant was not used to select and/or start the song.

The AEC bypass capabilities of the apparatus 300 and apparatus 400 in some embodiments are also used in an audio application such as a sound recorder in order to have the operating system and or the audio drivers do the mixing, rather than having to perform mixing in the audio application. Such an embodiment improves upon conventional systems by permitting applications to be developed with less application code.

Figure 6:
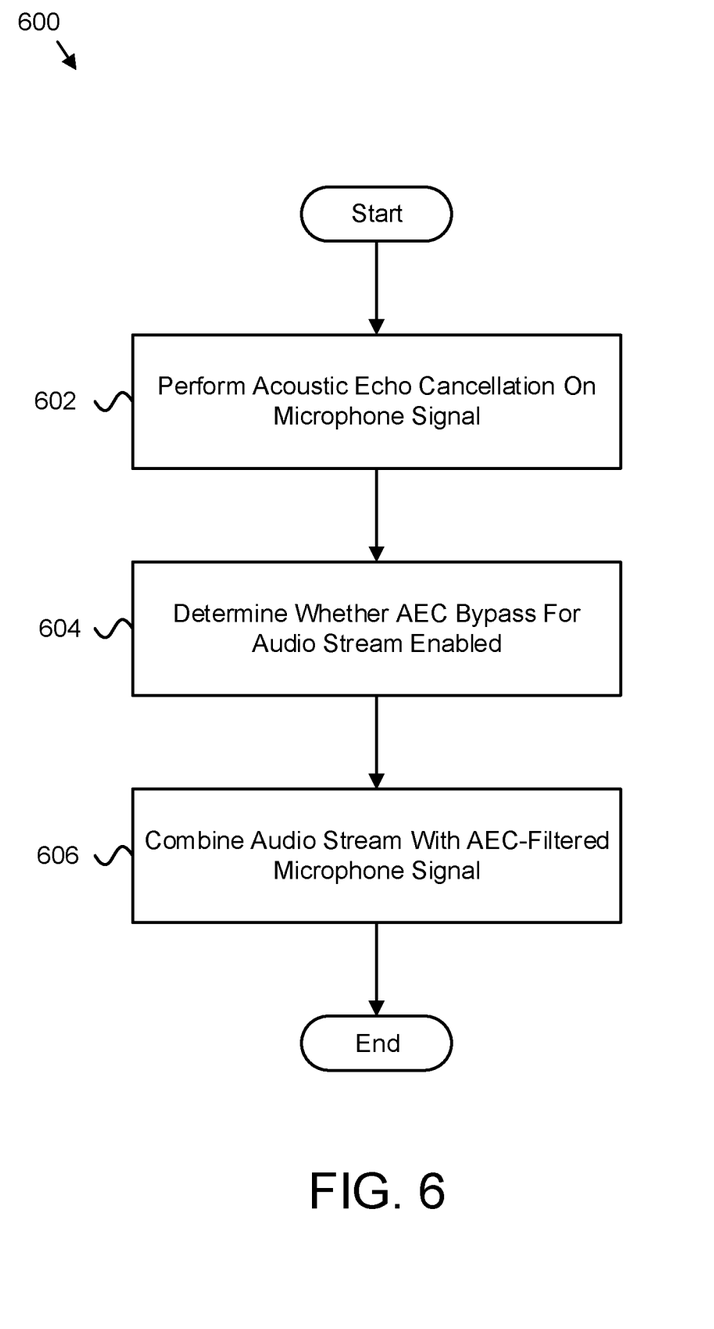
FIG. 6 is a schematic flow chart diagram illustrating one embodiment of a method for selective AEC filter bypass.

FIG. 6 is a schematic flow chart diagram illustrating one embodiment of a method 600 for selective AEC filter bypass. In one embodiment, the method 600 begins and performs 602 acoustic echo cancellation (AEC) on a microphone signal to produce an AEC-filtered microphone signal. The method 600 continues and determines 604 whether an AEC bypass parameter corresponding to an audio stream is enabled. The method 600 continues and combines 606 the audio stream with the AEC-filtered microphone signal to produce an AEC-filtered selectively combined signal in response to determining that the AEC bypass parameter corresponding to the audio stream is enabled, and the method 600 ends. In various embodiments, the filter 302, the bypass controller 304, and/or the mixer 306 perform one or more of the steps of the method 600.

Figure 7:
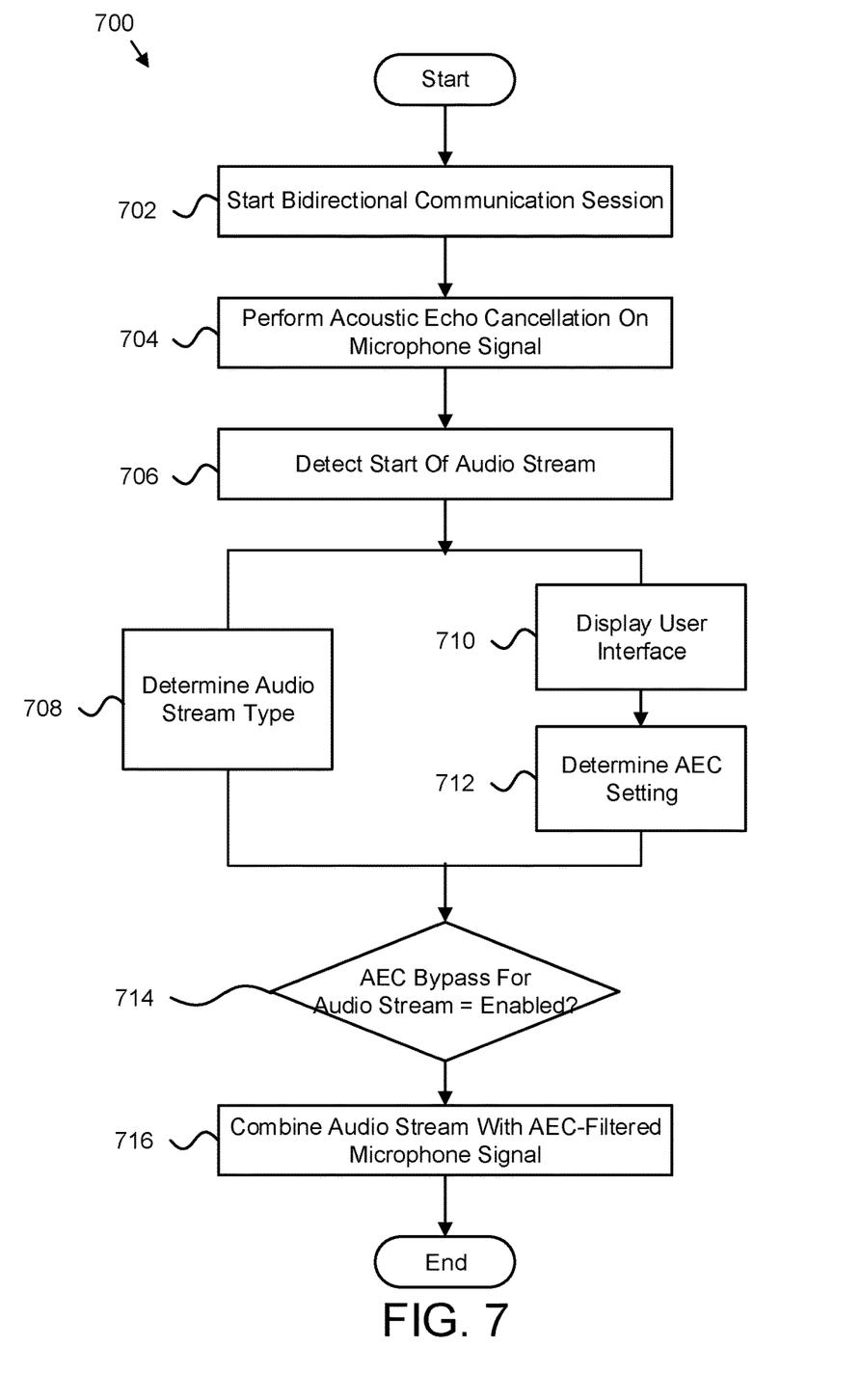
FIG. 7 is a schematic flow chart diagram illustrating another embodiment of a selective AEC filter bypass method.

FIG. 7 is a schematic flow chart diagram illustrating another embodiment of a method 700 for selective AEC filter bypass. In one embodiment, the method 700 begins and starts 702 a bidirectional communication session of voice data over a network connection, such as for example, a VOIP session or a smart assistant session similar to the example embodiments described above with respect to FIG. 3, 4, or 5. The method 700 continues and performs 704 AEC on a microphone signal to produce an AEC-filtered microphone signal. In various embodiments, the method 700 continues and detects 706 a start of an audio stream, such as for example, an audio file stored on a computer readable storage medium or a streaming audio source from a web browser or an audio application.

In some embodiments, the method 700 continues and determine 708 what the type of the audio stream is. In certain embodiments the method 700 displays 710 a user interface for selecting an AEC setting for the audio stream in response to detecting the start of the audio stream during an ongoing bidirectional communication session of voice data over the network connection. In certain embodiments, the method 700 determines 712 what the AEC settings are for individual audio streams.

The method 700 continues and determines 714, in some embodiments, whether an AEC bypass parameter corresponding to one or more of the audio streams is enabled based at least in part on the type of audio stream and/or the AEC bypass setting for the individual streams or for the individual types of audio streams. In various embodiments, the method 700 continues and combine 716 the audio stream or streams with the AEC-filtered microphone signal in response to determining that the AEC bypass parameter corresponding to the audio stream is enabled and the method 700 ends. In certain embodiments, the filter 302, the bypass controller 304, the mixer 306 and/or the user interface 402 perform one or more of the steps of the method 700.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a filter for an audio handling device that performs acoustic echo cancellation (AEC) on a microphone signal to produce an AEC-filtered microphone signal;
a bypass controller that determines whether an AEC bypass parameter corresponding to an audio stream is enabled; and
a mixer that combines the audio stream with the AEC-filtered microphone signal to produce an AEC-filtered selectively combined signal in response to determining that the AEC bypass parameter corresponding to the audio stream is enabled.

2. The apparatus of claim 1, wherein the bypass controller automatically enables the AEC bypass parameter in response to detecting a start of the audio stream during an ongoing bidirectional communication session over a network.

3. The apparatus of claim 1, wherein the bypass controller enables the AEC bypass parameter based on one or more of a type of the audio stream and an AEC setting for the audio stream.

4. The apparatus of claim 3, further comprising a user interface for selecting the AEC setting for the audio stream.

5. The apparatus of claim 4, wherein the user interface for selecting the AEC setting for the audio stream is displayed in response to detecting a start of the audio stream during an ongoing bidirectional communication session of voice data over a network.

6. The apparatus of claim 5, wherein the AEC setting is initialized at the start of the bidirectional communication session to disable the AEC bypass parameter for the audio stream.

7. The apparatus of claim 5, wherein the AEC setting is initialized at the start of the bidirectional communication session to enable the AEC bypass parameter for the audio stream.

8. The apparatus of claim 2, wherein the audio stream comprises one or more individual audio streams to be combined with the AEC-filtered microphone signal.

9. The apparatus of claim 8, wherein the AEC setting for the audio stream comprises one or more individual settings corresponding respectively to the one or more individual audio streams.

10. The apparatus of claim 1, wherein the audio handling device is a near end portable computing device and the AEC-filtered selectively combined signal is communicated at least over a wireless connection to a far end device.

11. A method comprising:
performing acoustic echo cancellation (AEC) on a microphone signal to produce an AEC-filtered microphone signal;
determining whether an AEC bypass parameter corresponding to an audio stream is enabled; and
combining the audio stream with the AEC-filtered microphone signal to produce an AEC-filtered selectively combined signal in response to determining that the AEC bypass parameter corresponding to the audio stream is enabled.

12. The method of claim 11, further comprising automatically enabling the AEC bypass parameter in response to detecting a start of the audio stream during an ongoing bidirectional communication session of voice data over a network.

13. The method of claim 11, wherein enabling the AEC bypass parameter is based on one or more of a type of the audio stream and an AEC setting for the audio stream.

14. The method of claim 13, further comprising selecting the AEC setting for the audio stream.

15. The method of claim 14, further comprising displaying a user interface for selecting the AEC setting for the audio stream in response to detecting a start of the audio stream during an ongoing bidirectional communication session of voice data over a network.

16. The method of claim 15, wherein the AEC setting is initialized at the start of the bidirectional communication session to disable the AEC bypass parameter for the audio stream.

17. The method of claim 15, wherein the AEC setting is initialized at the start of the bidirectional communication session to enable the AEC bypass parameter for the audio stream.

18. The method of claim 12, wherein the audio stream comprises one or more individual audio streams to be combined with the AEC-filtered microphone signal.

19. The method of claim 18, wherein the AEC setting for the audio stream comprises one or more individual settings corresponding respectively to the one or more individual audio streams.

20. A system comprising:
an audio handling device comprising one or more processors, computer readable storage media, and code executable by the one or more processors;
one or more microphones that provide a microphone signal to the audio handling device;
one or more speakers that play audio output from the audio handling device, wherein the audio handling device is configured to:
perform acoustic echo cancellation (AEC) on the microphone signal to produce an AEC-filtered microphone signal;
determine whether an AEC bypass parameter corresponding to an audio stream is enabled; and
combine the audio stream with the AEC-filtered microphone signal to produce an AEC-filtered selectively combined signal in response to determining that the AEC bypass parameter corresponding to the audio stream is enabled.

* * * * *